United States Patent [19]

Marschak

[11] 4,032,098

[45] June 28, 1977

[54] BASE FOR AN UPRIGHT FOR FORMING A STAND OR THE LIKE

[76] Inventor: Howard J. Marschak, 865 W. North Ave., Chicago, Ill. 60622

[22] Filed: Apr. 23, 1976

[21] Appl. No.: 679,860

[52] U.S. Cl. .............................. 248/165; 248/188.7; 248/529

[51] Int. Cl.² ........................................ F16M 11/32

[58] Field of Search .................. 211/181, 189, 205; 248/460, 463–465, 150, 151, 153, 165, 175, 188, 188.7, 188.8, 529

[56] References Cited

UNITED STATES PATENTS

| 1,591,110 | 7/1926 | Willson ........................... 248/165 X |
| 3,078,063 | 2/1963 | Frankl ............................ 248/188.7 |
| 3,080,067 | 3/1963 | Lind ............................ 248/188.8 X |
| 3,200,960 | 8/1965 | Banse ........................... 248/DIG. 3 |
| 3,244,128 | 4/1966 | Rogalski et al. ............. 248/188.7 X |
| 3,288,412 | 11/1966 | Murphy ...................... 248/188.7 X |
| 3,524,616 | 8/1970 | Marschak ....................... 248/188.7 |
| 3,563,579 | 2/1971 | Reiner ........................... 248/188.7 |
| 3,787,018 | 1/1974 | Nathan ............................... 248/529 |

FOREIGN PATENTS OR APPLICATIONS

| 94,362 | 6/1969 | France ........................... 248/188.7 |
| 1,317,222 | 1/1963 | France ........................... 248/188.7 |

*Primary Examiner*—Lawrence J. Staab
*Attorney, Agent, or Firm*—Vogel, Dithmar, Stotland, Stratman & Levy

[57] ABSTRACT

A base for an upright for forming a display stand or the like, which base is formed of a plurality of legs, said upright having a connector member insertable in the bottom of the upright and with said connector member having recesses adapted to receive the vertical bottom inner end of the legs and with the upper portion of the legs having an upper hooking end to engage openings in the upright above the bottom of the upright. The legs are capable of being readily attached to the upright without the use of extraneous fastening elements and/or tools and readily detachable for the purpose of collapsing the stand so that it occupies a minimum of space in the carton.

2 Claims, 3 Drawing Figures

BASE FOR AN UPRIGHT FOR FORMING A STAND OR THE LIKE

SUMMARY OF THE INVENTION

One of the objects of this invention is to provide a base for an upright which forms a display stand, merchandise rack and the like, with the base formed of a plurality of legs which are detachably secured to the upright to support the upright in a vertical position, and wherein the legs and the upright may be packaged, shipped and stored in a knock-down conditions to occupy a minimum of space, and wherein the legs may be readily secured to the upright and interlocked therewith without the use of any extraneous fastening or locking means and without requiring the use of any tools.

Another object of this invention is to provide a structure of the foregoing character which is relatively inexpensive and simple to produce and which is readily assembled on the spot merely by connecting the parts in their proper position. This may be accomplished by inexperienced persons in a short period of time and without the use of any tools. This structure may be readily set up and readily dismantled.

DESCRIPTION OF THE PREFERRED EMBODIMENTS

Figure 1:
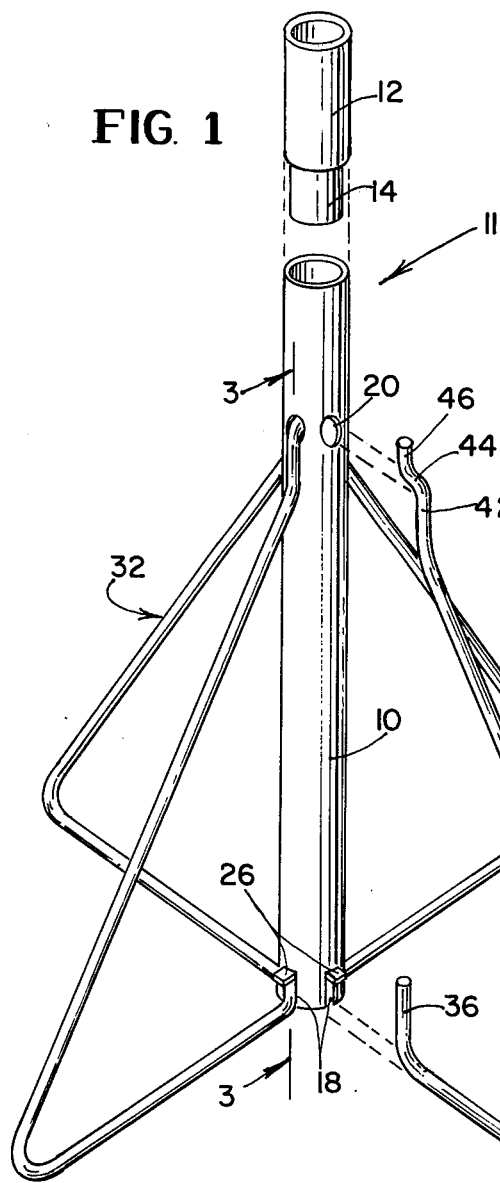
FIG. 1 is a perspective view showing several of the legs secured to the upright, with one of the legs in a detached position for the purpose of illustration.

The tubular member to which the legs are secured is generally indicated at 10, and it forms part of the vertical supporting member or upright generally indicated at 11. The upright 11 consists of a conventional tubing which may be made of steel, plastic or fiberboard, or the like. The upright may be of a single section of any desired height or may be made up of a plurality of tubular sections as shown, including a section generally indicated at 12 telescopically connected to section 10 by inserting the reduced end 14 of section 12 into the top end of section 10. Any number of tubular telescoping sections may be used dependent on the height desired. The telescoping sections permit the upright to be of substantial height, yet when disassembled, can be shipped and/or stored in a relatively small carton to occupy a minimum area of space. The invention herein is principally concerned with providing legs which are detachably secured to the lowermost tubular portion 10, which then provides support for the entire upright and/or the display material which may be supported on said upright.

The bottom of the tubular upright or upright section 10 is open as indicated at 16 and the tubular upright is provided with a plurality of equally and circumferentially spaced slots 18 which extend from the bottom end of the tubular section to a short distance above the bottom end. Four of such slots are shown, as four legs are to be accommodated; however, any plurality number of legs and corresponding slots may be utilized to support the upright.

The tubular section 10 is provided with a plurality of equally and circumferentially spaced circular openings designated by the numeral 20, with said openings positioned substantially above the bottom end of the tubular section and with each opening 20 being in vertical alignment with a respective slot 18 therebelow. The said openings 20 correspond to the number and spacing of slots 18 at the bottom of the tubular section.

Figure 2:
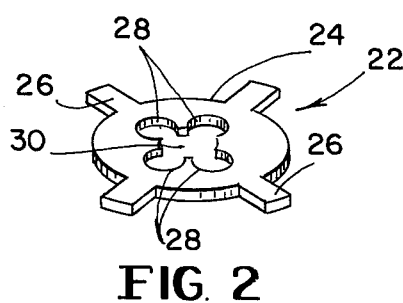
FIG. 2 is a view of the connector member which is insertable in the bottom of the upright and to which the bottom of the legs are attached.
Figure 3:
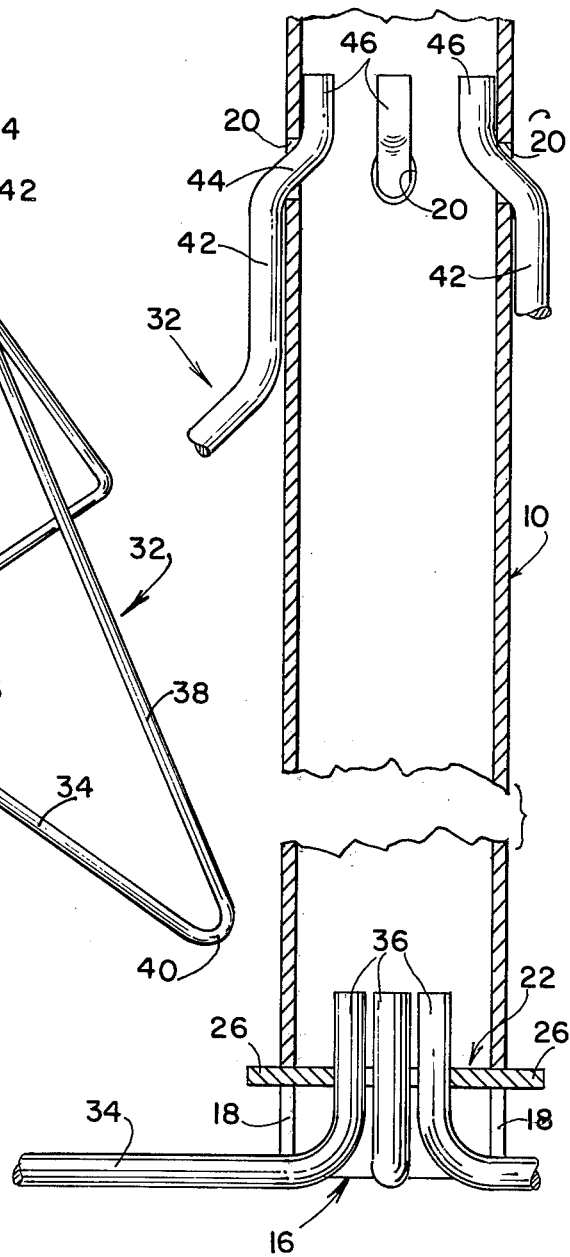
FIG. 3 is an enlarged view, partly in cross section, taken on lines 3—3 of FIG. 1 showing the manner in which the legs are attached to the upright.

The connector member is best shown in FIGS. 2 and 3 and is generally designated at 22 and comprises preferably a metal stamping which in the main is of a circular shape as indicated at 24 but provided with four equally spaced radiating extensions or lugs 26. The central portion of the connector member is stamped to provide four inwardly facing arcuate-shaped recesses each indicated by the numeral 28. Each of the arcuate-shaped recesses 28 is an alignment with a respective lug or extension 26. The central portion of the connector member provides a central opening 30 which communicates with the arcuate-shaped recesses 28. The circumference of the circular portion of the connector member is slightly less than the inner circumference of the tubular section 10 so that the connector member may be inserted therein.

In assembling the unit, the connector member 22 is inserted through the open bottom 16 of the tubular section 10 with the lugs 26 of the connector member fitting into the slots 18 in the tubular member. The connector member 22 is positioned against the inner end of the slots 18 and will be held in such a position when the legs to be described are to be attached thereto as best shown in FIGS. 1 and 3.

As shown in FIG. 1, four legs are to be used to support the upright, although it will be understood that a lesser or greater number of legs may be spacedly positioned and used with a corresponding number of bottom slots 18 and annular openings 20. All of the legs are of identical construction and therefore only one will be described in detail. The leg, generally indicated at 32 is made of a rigid wire having some degree of resiliency or "give" and is integrally formed and shaped to provide a base or horizontal portion 34 with an upwardly turned vertical bottom end 36. Extending upwardly of the base or horizontal portion 34 at the outer end is an inclined or angular portion 38. The inclined portion 38 is rounded as at 40 adjacent the horizontal portion 34. The inclined portion 38 continues and is bent upwardly so that it extends in a vertical plane for a portion thereof, said vertical portion being indicated by the numeral 42. The upper end is then bent upwardly at an inclined angle for a portion thereof as indicated by the numeral 44 and terminates in an upper vertical end portion 46. The upper vertical end portion 46 and the vertical portion 42 are parallel but in different vertical planes as can best be seen in FIG. 3. The upper portion of the leg defined by the portions 44 and 46 may sometimes be referred to as the upper hooking end of the leg.

The lugs 26 of the connector member 22 may, if desired, be of a width so that they are wedged in the slots 18 when inserted. In such instances, the connector member 22 may be inserted into the tubular section 10 at the point of manufacture so that it always remains affixed to the tubular section, or it may be shipped unaffixed and inserted at the destination point where the legs are attached.

To connect the legs 32 to the tubular section 10, the upper end of each of the legs is first inserted into one of the spaced openings 20 by inserting the upper vertical end 46 into the opening and manipulating same so that the upper vertical end 46 is positioned inside and against the interior wall of the tubular section with the angular portion 44 positioned partially in said opening and with the vertical portion 42 of the leg positioned adjacent or against the exterior wall surface of the tubular section 10 as best shown in FIG. 3. The bottom of the leg is then positioned so that the vertical bottom end portion 36 is inserted into the interior of the tubular section 10 and into the arcuate-shaped recess 28 of the connector member 22, which recess 28 would be in substantial alignment with the upper opening 20. Each of the legs is secured to the tubular section 10 in this manner, so that after the four legs are thus positioned, they will be securely attached to the upright to support same in a vertical position. The vertical bottom end portion 36 of the leg will bear or press against the connector member 22 and will serve to hold the connector member in the position shown in FIG. 3 unless same has been previously wedged therein as previously described. The connector member 22 will be spaced upwardly from the bottom of the tubular section 10. In this manner, the legs will support the upright in a positive and firm position and the legs will be locked to the upright. As is evident, all of this can be done without the use of any extraneous fastening elements or the use of tools. The legs may be readily disassembled by reversing the procedures so that each is detachable from the upright.

As best seen in FIG. 3, when the legs are attached, the vertical bottom end portion 36 will be parallel to the upper vertical end portion 46 but will extend further inwardly into the tubular section 10.

It can be appreciated that when four legs are used, the two opposite legs are diametrically opposed and thus the four legs form a cross-like shaped base when the four legs are connected to the upright. By providing the detachable legs in the manner described, legs may be packed with the upright in a collapsed condition and require a minimum of space.

What is claimed is:

1. A base for a tubular upright which has an opening at the bottom thereof, a plurality of spaced openings in said upright positioned above the bottom of said upright, a plurality of leg members detachably secured to said tubular upright to support the upright in a vertical position, each of the leg members formed of wire having a substantially small diameter in cross section and having a base portion and an inclined portion extending upwardly of the base with the upper end of the inclined portion having a hooking end which engages the spaced openings in said tubular upright with said hooking end positioned inside said tubular upright to secure the upper end of said leg member to said upright, said base portion having an upwardly extending inner end substantially at right angles to said base portion, said bottom of said tubular upright having spaced slots, a connector insertable inside said tubular member from the bottom of the tubular upright and positioned above the bottom of the tubular upright, said connector having spaced lugs engaging said spaced slots to retain said connector in said tubular upright, said connector further having central openings to receive the upwardly extending inner ends of said legs, said base portions of said legs entering the spaced slots of said tubular upright below said connecting with the upwardly extending inner ends thereof extending through the central openings of said connector to secure the bottom of said legs to said connector and to said tubular member.

2. A structure as set forth in claim 1 in which the upwardly inclined portion of the leg merges into a vertical portion which merges into the hooking end, with said vertical portion positioned exteriorly of but adjacent the wall of the upright.

* * * * *